DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 790

T908,008

CROSS-LINKED POLYOLEFINS

Richard L. McConnell, 421 Manderly Road, Kingsport, Tenn. 37663; Doyle A. Weemes, 1603 Moore Ave., Greenville, Tenn. 37743; and Frederick B. Joyner, 404 Meadow Lane, Kingsport, Tenn. 37663

Filed Sept. 28, 1972, Ser. No. 293,263

Int. Cl. C08f *29/02*

U.S. Cl. 260—88.2 S

No Drawing. 12 Pages Specification

Cross-linked moldable compositions are prepared by heating crystalline polyolefin prepared from alpha-olefin monomers having at least three carbon atoms at a temperature below the threshold degradation temperature of the polyolefin and above the temperature necessary to maintain the polyolefin in a disordered state in the presence of at least 12.5 weight percent of peroxide for a period of at least 0.25 hour. The reaction may be carried out in solution or in melt phase. The peroxides are used in amounts up to about 30% by weight and are chosen from those peroxides having a half life of from 0.6 second at 250° C. to 1000 hours at 80° C. Suitable temperatures range from 105° C. to 250° C.